M. E. REISINGER.
ADJUSTABLE ENTRANCE GATE FOR BEEHIVES.
APPLICATION FILED AUG. 12, 1916.
1,243,555.
Patented Oct. 16, 1917.
2 SHEETS—SHEET 1.
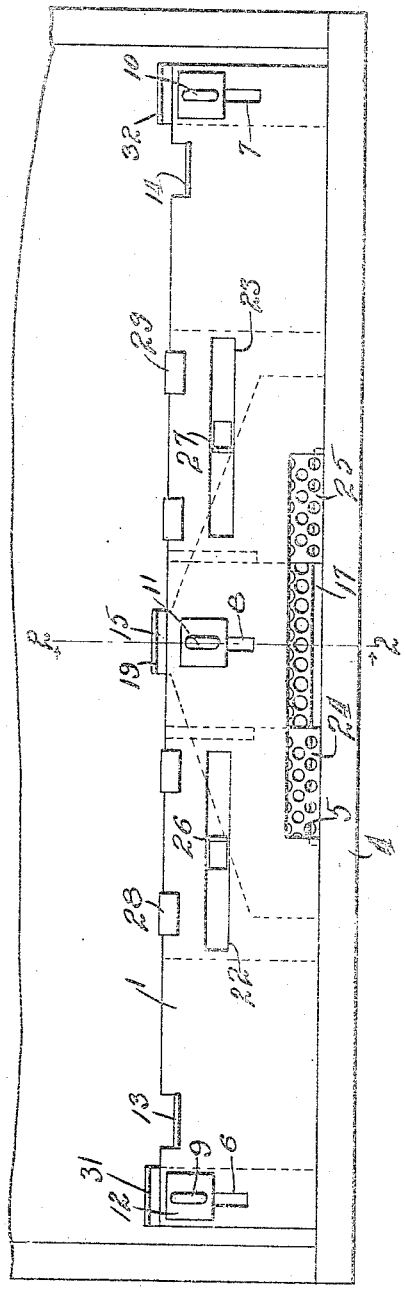
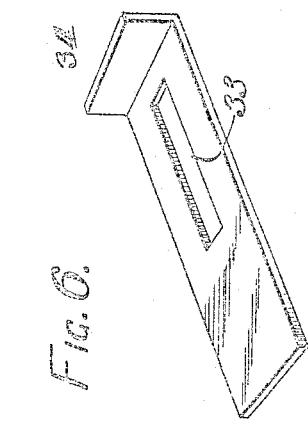
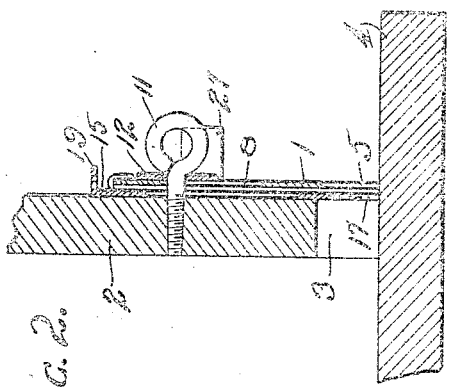
WITNESSES
INVENTOR
MARION E. REISINGER
BY
ATTORNEY

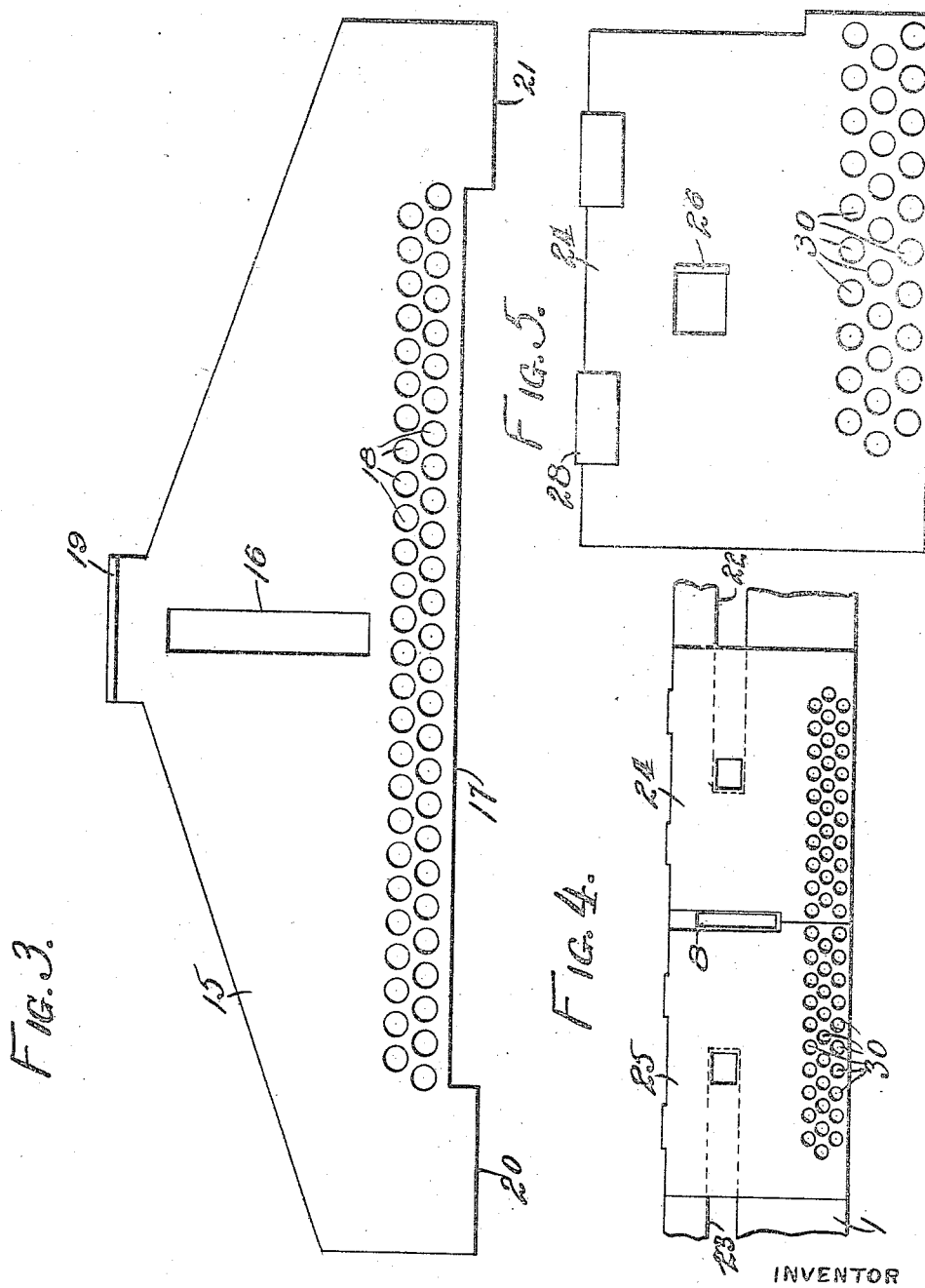

UNITED STATES PATENT OFFICE.

MARION E. REISINGER, OF ALBION, IOWA.

ADJUSTABLE ENTRANCE-GATE FOR BEEHIVES.

1,243,555.      Specification of Letters Patent.      Patented Oct. 16, 1917.

Application filed August 12, 1916. Serial No. 114,572.

*To all whom it may concern:*

Be it known that I, MARION E. REISINGER, a citizen of the United States, residing at Albion, in the county of Marshall and State of Iowa, have invented certain new and useful Improvements in Adjustable Entrance-Gates for Beehives, of which the following is a specification.

This invention relates to an improvement in entrance gates for beehives, and it is a purpose to provide a gate of this nature which may be inexpensively manufactured and may be fitted in conjunction with standard forms of beehives to permit entire closure of the gate opening or entrance except for air or ventilation passages, or may be adjusted to and set in a relation that the entrance opening is left free and unobstructed.

A further object is to so construct the parts of the gate that adjustment may be made to vary the width and size of the entrance opening to be proportioned to the size of the swarm, and to thus give the proper entrance opening for a large swarm while at the same time permitting adjustment of the parts to accommodate a weak swarm and to thus aid the swarm in guarding the entrance to the hive to prevent robbers from coming thereinto.

Yet another object is to so construct the gate members that they may be moved to a relation to allow the bees to pass freely from the hive so that both the worker bees and the drones will go out, and to provide gages by which the gate portions may be set to permit the return of the worker bees into the hive while the drones will be excluded, after which the gate may be entirely closed to keep the worker bee therein and the drones may be destroyed.

With the above and other objects in view, my invention consists in certain novel features of construction and combinations of parts which will be hereinafter set forth in connection with the drawings and then more particularly pointed out in the claims.

In the drawings:

Figure 1 is a fragmentary view in elevation of the lower part of a beehive showing my improved entrance gate fitted in place thereon and with the parts adjusted to the operative positions.

Fig. 2 is a transverse vertical sectional view taken on the line 2—2 of Fig. 1.

Fig. 3 is an enlarged detail view to better show the entrance guard.

Fig. 4 is a view in elevation of portions of the disassembled gate to better disclose the form and mounting of the perforated closing slide.

Fig. 5 is a view in elevation showing one of the perforated slides in full detail.

Fig. 6 is a perspective view of one of the drone excluder gages.

The main gate 1 is preferably constructed from a single piece of galvanized sheet steel or other suitable sheet material and is made of the proper length to cover the full entrance opening of the hive. It is preferable that this main gate be made to have substantially the proportions as illustrated in the drawing, and while dimensions might be given for various sizes of hives constructed to accommodate a given number of frames, it will of course be appreciated that where various sizes of hives are used, the length of the main gate will be varied. This main gate is made approximately 2 inches wide or of any proper width which will give the desired stiffness to the gate and will bring the main gate member well up on the front of the hive as indicated at 2, above the main entrance as shown at 3, and this main gate has a center opening at the lower edge thereof which is approximately 5 inches wide and ¼ inch deep. By making the opening at the lower edge of the main gate 1 of the height mentioned, an opening may be left which will be sufficiently large that the worker bees, drones, and queen bees may readily pass into and from the hive. It is a purpose that the main gate 1 shall be so mounted that it may be raised to permit opening of the full extent of the entrance 3 for the hive or may be closed down to have its lower edge bear against the upper side of the bottom 4 of the hive in which relation the only passage to and from the hive will be through the gate or entrance opening 5 which is formed at the lower edge of this main gate, and to hold the main gate 1 in the proper relation, I provide the same with the vertically extending slots 6, 7, and 8 which are formed adjacent to the end edges of the gate and at the approximate center, and pass screw-eyes 9, 10 and 11 through these openings to be embedded in the front wall 2 of the hive so that adjustment of the screw-eyes may be made by turning the same to either bring the screw-eyes to clamp the main gate 1 in a stationary mounting or to release the same so that movement may be made thereof. To give the proper bearing of the screw-eyes 9, 10 and 11, against the main gate 1, it is preferable that the clamp washers 12 be disposed around each of these screw-eyes. To aid in the adjustment of the main gate by raising and lowering the same, it is preferable that the upper edge of this gate be cut and bent to provide the finger lifts 13 and 14 adjacent to each end of the gate.

For ordinary conditions of use, the entrance opening 5 of the main gate 1 will be higher than is required, and thus enemies of the bees may readily find their way into the hive, also the drones of the swarm may readily leave and return to the hive, and I therefore find it desirable to provide an entrance guard 15 which is shaped as is better shown in Fig. 3, so that it may be fitted between the main gate 1 and the forward walls 2 of the hive, a slotted opening 16 being provided to the entrance guard so that the screw-eye 11 may pass therethrough and this entrance guard may thus be moved with and independently of the main gate and when brought to the proper adjusted position can be held in place by tightening of the screw-eye 11. This entrance guard has an entrance opening 17 formed by notching out and cutting away the central portion of the lower edge of the plate forming the same and this entrance opening 17 is preferably made of a less height than the height of the entrance opening 5 of the main gate, the perforations as indicated at 18 being formed through the entrance guard above the entrance opening 17 to give additional air circulation passages. A lift 19 is provided on the upper portion of the entrance guard 15 to be at all times above the upper edge of the main gate 1 and thus this entrance guard may be readily moved to adjust the same to vary the height of the entrance opening which is permitted into the hive, and when the entrance guard 15 has been brought down to its lowermost adjusted position, the ends 20 and 21 will bear against the bottom 4 of the hive and will leave an entrance opening equal in height to the depth of the notch entrance 17 of this guard, it of course being understood that the perforations 18 will in such a mounting of the entrance guard be presented to give additional ventilation through the opening 5 of the main gate 1.

It will of course be understood that the adjustment of the entrance guard 15 will act to decrease the size of the entrance opening to the hive by decreasing the height of the same while the width will be permitted to remain equal to the length of the opening 5 to the main gate 1, and under some circumstances it may be desired to decrease the size of this opening 5 by shortening the length thereof while permitting the height to remain equal to the height of the entrance opening 5 of the main gate.

With the above in mind, I provide the longitudinally or horizontally extending slotted openings 22 and 23 through the main gate 1 on each side of the central slotted opening 8, and mount the pivotal slides 24 and 25 so that the finger catches 26 and 27 which are formed by straightening out and bending up portions of the metal of the plate will be received through these slotted openings 22 and 23 when the slide plates or perforated slides are mounted rearwardly of the main gate 1 and between the same and the entrance guard 15, hook flanges 28 and 29 being provided on the perforated slides 24 and 25 to fit over and hook down upon the upper edge of the main gate 1 so that these perforated slides will be held against displacement from the fitted relation and will be permitted to have free sliding movement in the travel of the finger catches 26 and 27 throughout the length of the slotted openings 22 and 23 when the screw-eyes have been released from the clamping engagement against the main gate. These perforated slides 24 and 25 may be adjusted in conjunction with or independently of the entrance guard 15 and thus not only may the height of the entrance opening be varied, but also the width of the passage may be increased or decreased at each side or these perforated slides may be closed to abut at their inner ends and thus the entrance to the hive will be entirely closed to permit the hive to be moved with a swarm housed therein, it being understood that the slides 24 and 25 are each provided with perforations as shown at 30 so that when these slides are brought to the closed or partially closed position the openings will be presented to give the proper ventilation in the hive. By extending the finger catches 26 and 27 through the slotted openings 22 and 23, the perforated slides are not only held against displacement from the proper fitted position, but also these finger catches 26 and 27 are presented to permit manipulation of the perforated slides readily from the outer side of the main gate 1, it of course being understood that the screw-eye 11 must be released from the clamping engagement with the main gate before this adjustment can be made, and then after the proper adjustment has been obtained, the parts will be held in this relation against displacement by retightening of the screw-eye 11.

Not only may the entrance guard 15 be used to secure the proper adjustment of the size of the entrance opening into the hive, but also this member may be used in conjunction with the main gate 1 as a drone excluder. The drone excluder gages 31 and 32, which are provided with the slotted openings 33 are each formed to be somewhat longer than the height of the main gate 1 and have the stop flanges 34 formed at their upper ends. In use, these excluder gages are fitted behind the main gate 1 adjacent to the ends thereof in such relation that the screw-eyes 9 and 10 will be received through the slotted openings 33 thereof and thus the excluded edges may be moved with the main gate 1 and at the same time the main gate may be given independent movement and the extent of this independent movement of the main gate may be gaged as the stop flanges 34 are encountered by the upper edge thereof. When it is desired to eliminate the drones from the worker bees in the swarm, the main gate 1 and the remaining parts will be opened during the day to allow both the drones and the worker bees to pass from the hives, it being preferable that the full entrance opening of the hive as indicated at 3 be left free and unobstructed, and then when the bees have gone out of the hives, the entrance guard 15 will be lowered to have the ends 20 and 21 rest upon the upper side of the bottom 4 of the hive thus presenting a passage equal in height to the depth of the notch opening 17 of this guard. Each of the screw-eyes 9, 10 and 11 having previously been released, the main gate will then be moved down to a relation that the excluder gages 31 and 32 rest at their lower ends against the top of the bottom 4 of the hive and by bearing down on the flanges 34 and raising on the finger lips 13 and 14 of the main gate 1, this main gate may be adjusted to have the lower edge thereof at each side of the opening 17 of the entrance guard brought above the top surface of the bottom 4 of the hive adjustment approximately equal to the height of the opening 17 through the entrance guard 15. The screw-eyes, 9, 10 and 11 will again be tightened and thus a comparatively low entrance passage will be left throughout substantially the entire width of the hive. This entrance opening is gaged to be of such a height that the worker bees can clearly find their way therethrough and into the hive, but that the drones will be prevented from passing, and then after the worker bees have gone into the hives for the night, the perforated slides 24 and 25 may be closed to confine the worker bees within the hive and the drones which will have collected on the step of the floor or bottom 4 of the hive can be destroyed.

From the foregoing it will be seen that I have provided an entrance gate for beehives which is so constructed that a number of variations in the size of the entrance opening may be accomplished, that the entrance passage may be entirely closed to confine the bees within the hive when the same is to be moved and at the same time ventilation will be accomplished, and that by proper manipulation of the parts the drones may be excluded from the swarm to thus give the full working efficiency conducing capacity to the swarm.

While I have herein shown and described the device of my invention as being constructed of sheet metal cut and bent to the proper form and have described the use of screw-eyes to hold the parts in the adjusted relation, it will be understood that various other materials might prove successful in use in the conception of this device, that other forms of securing means for holding the parts in the proper adjusted relations might be employed and that a number of changes and modifications might be resorted to in the form and arrangement of the several parts without departing from the spirit and scope of my invention, and hence I do not wish to be limited to the exact disclosure but rather only to such points as may be set forth in the claims.

I claim:

1. An entrance gate for beehives comprising a main gate having a front opening formed therethrough, slides arranged in conjunction with said main gate to adjust the length of the passage permitted through the opening thereof, an entrance guard constructed to be adjusted with respect to the main gate member to vary the height of the opening made therethrough, and means to mount the main gate member in the proper relation with respect to the entrance to the hive and to hold the remaining parts in their adjusted mounting.

2. An adjustable entrance gate for beehives comprising a main gate member having an entrance opening provided therein, perforated slides mounted in conjunction with said main gate to be capable of sliding movement to throw perforated portions of said slides before the entrance opening of the gate to vary the vertical and longitudinal dimensions of the entrance opening, and means to secure said main gate in proper positioning before the entrance of a beehive and to hold said perforated slides in desired adjustment with respect to the main gate.

3. An entrance gate for beehives comprising a main gate member, said main gate member provided with an entrance opening formed at one edge thereof, an entrance guard adapted to be adjustably mounted adjacent to said entrance opening of the main gate provided with a relatively smaller entrance opening to give a comparatively low entrance when the guard is adjusted in its extreme closed position, excluder gages arranged in conjunction with the main gate to give a predetermined height of adjustment to permit fitting of this main gate to give an entrance opening substantially identical in height with the entrance opening to the guard, and means to mount said main gate and entrance guard upon a hive in the proper fitted positions and to allow adjustment of the parts.

4. An adjustable entrance gate for beehives comprising a main gate member provided with an entrance opening located centrally in the lower edge thereof, said main gate having vertically extending slotted openings formed therethrough at spaced apart points and provided with longitudinally extending slotted openings arranged on each side of the longitudinal center, an entrance guard arranged to be mounted against said main gate adjacent to the entrance opening therethrough and provided with a slotted opening, perforated slides mounted against the main gate with portions thereof fitted over said gate to hold the slides in the proper relation and with finger catches extended through the longitudinally extending slotted openings to allow adjustment of the perforated slides, and means extended through the vertically disposed slotted openings of the main gate and through the slotted openings of the entrance guard to mount the parts in the proper relation upon a beehive and to permit securement of the parts in adjusted relation.

5. An adjustable entrance gate for beehives comprising a main gate member provided with an entrance opening located centrally in the lower edge thereof, said main gate having vertically extending slotted openings formed therethrough at spaced apart points and provided with longitudinally extending spaced apart slotted openings on each side of the center, an entrance guard arranged to be mounted against the gate adjacent to the entrance opening therethrough and provided with a slotted opening, perforated slides mounted against the main gate with portions thereof fitted over said gate to hold the slides in the proper relation and with finger catches extended through the longitudinally extending slotted openings to allow adjustment of the perforated slides, means extended through the vertically disposed slotted openings of the main gate and through the slotted openings of the entrance guard to mount the parts in the proper relation upon a beehive and to permit securement of the parts in adjusted relation, said entrance guard and slides provided with perforations in those portions which close within the entrance opening of the main gate to thus give free ventilation to the hive, and excluder gages arranged in conjunction with the main gate to allow ready adjustment to be made of the parts to leave a passage for the worker bees and to sufficiently constrict the entrance opening that the drones will be excluded from the hive.

In testimony whereof I affix my signature in presence of two witnesses.

MARION E. REISINGER.

Witnesses:
A. L. BURGETT,
J. A. TURNER.

Copies of this patent may be obtained for five cents each, by addressing the "Commissioner of Patents, Washington, D. C."